Nov. 1, 1960 G. K. BALF 2,958,810
ELECTRIC METER BOX
Filed May 1, 1958
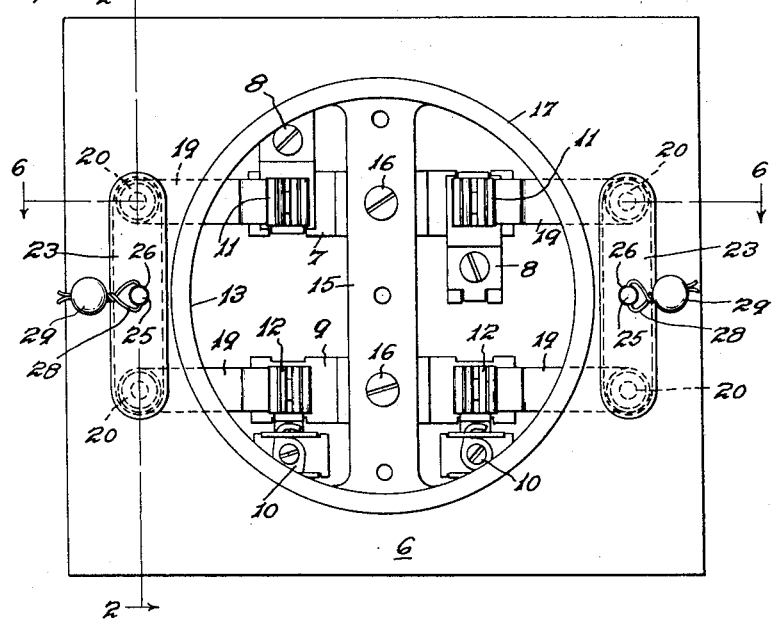
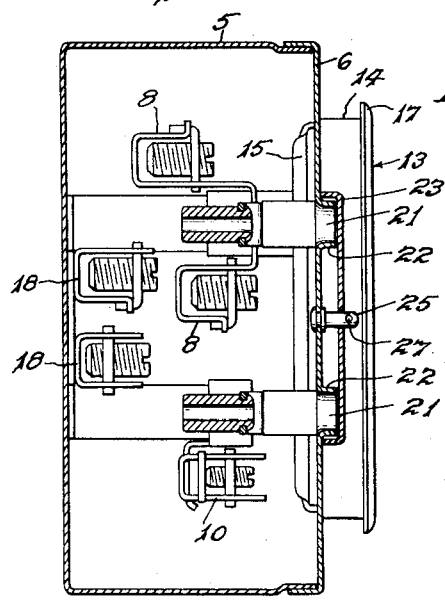
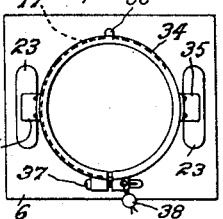
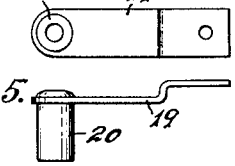
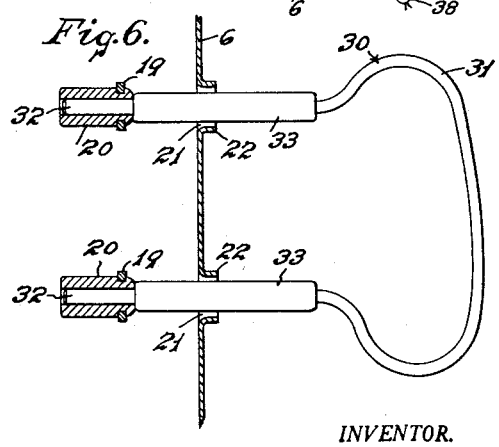
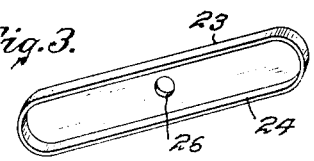
INVENTOR.
GEORGE K. BALF
BY Louis V. Lucia
ATTORNEY.

United States Patent Office 2,958,810
Patented Nov. 1, 1960

2,958,810

ELECTRIC METER BOX

George K. Balf, 664 Bloomfield Ave., Bloomfield, Conn.

Filed May 1, 1958, Ser. No. 732,292

2 Claims. (Cl. 317—107)

This invention relates to an electric meter box and more particularly to meter boxes of conventional types on which electric meters are mounted and sealed against being dismounted by unauthorized persons.

It is well known that such types of boxes are provided with terminals for electric supply lines to buildings, stores and other places where electric current is used and are adapted for mounting a meter across said lines. Such boxes are also provided with means for sealing the meter so that it cannot be removed and so that the box itself cannot be opened without the seal first being broken.

When such types of sealed meter boxes are used and the meter is being changed, or temporarily removed from the box for testing or repairs, a break is caused in the supply of electric current which, in some cases, is very objectionable for the reason that it disrupts the normal operation of certain appliances, such as electric clocks, and shuts off the lights, which is particularly undesirable in places such as stores, halls and the like.

An object of this invention, therefore, is to provide an electric meter box of conventional form having novel means whereby the current supply may be jumped across the terminals in the box so that the meter may be removed without interrupting the supply of electric current.

A further object of this invention is to provide sealable means for rendering access to the terminals in the box without first requiring removal of the meter from the box.

Further objects and advantages of this invention will be more clearly understood from the following description and the accompanying drawing in which:

Fig. 1 is a front view of a conventional meter box constructed in accordance with my invention, the same being shown without having the meter mounted thereon.

Fig. 2 is a sectional side view on line 2—2 of Fig. 1.

Fig. 3 is an isometric view of one of the covers used for my invention.

Fig. 4 is a plan view of one of the terminals used for my invention.

Fig. 5 is a side view thereof.

Fig. 6 is a sectional plan view, on line 6—6 of Fig. 1, in diagrammatic form, illustrating the operation of my invention.

Fig. 7 is a front view, on a greatly reduced scale, illustrating a modified form of my invention.

As illustrated in the drawing, the numeral 5 denotes a meter box of a conventional form which is provided with a cover 6. Within the said box, there is mounted an insulating block 7 having thereon a pair of electrical terminals 8—8. Another insulating block 9 is also provided and has electrical terminals 10—10 mounted thereon.

Each of said terminals 8—8 and 10—10 are provided with receptacles in the form of clips 11—11 and 12—12, respectively, which are adapted to receive prongs projecting from an electric meter, not shown, that is adapted for mounting upon said box.

Upon the cover 6, there is detachably mounted a meter supporting ring 13 which fits within a flange 14 on said cover and has a crossbar 15 by means of which said supporting ring is removably secured to the blocks 7 and 9 by suitable screws 16—16. Said supporting ring has an outwardly extending annular flange 17 which overlaps the edge of the flange 14 and thereby secures the cover 6 upon the box 5.

Such meter boxes are usually mounted upon the wall of a building or a store to which the electric current is supplied. The supply lines from the outside of the building are connected to the terminals 8—8 and, when a three-line circuit is used, the "neutral" wire is connected to one of the ground terminals 18—18 which are provided upon the bottom of the box 5. The wires leading to the circuit in the building are connected to the terminals 10—10 and the "neutral" wire to said circuit is also connected to the other terminal 18.

When the meter is mounted upon the flange 17, the prongs of said meter are received within the clips 11—11 and 12—12. The meter is then secured in mounted position upon the box with a conventional binding ring, not shown, which encircles the flange 17 and a cooperating flange on the meter and said binding ring is sealed so that it cannot be detached from the box for removal of the meter without the seal first being broken to thereby prevent the removal of the meter by unauthorized persons. It will be understood, therefore, that when the meter is mounted upon the box, it provides an electrical connection across the terminals 8—8 and 10—10. When the meter is removed from the box, the said connection is broken and the supply of current is interrupted.

In accordance with the present invention, I provide upon the terminals 8—8 and 10—10 extension bars 19 which are preferably mounted under the clips 11—11 and 12—12 as shown and electrically connected thereto. Each of said bars 19 carries at its outer end a receptacle 20 having an axial bore adapted to receive a conventional jumper as will be hereinafter further described. In alignment with each of the receptacles 20, there is provided in the cover 6 an opening 21 which is preferably surrounded by an annular flange 22 that extends outwardly of said cover 6. A pair of elongated supplemental covers 23—23 are provided for said openings 21 and each of said covers extends over two of the openings 21 at each side of the box.

Each of said supplemental covers 23 has a surrounding flange 24 which fits around the flanges 22 to shield the holes 21 against the weather and is secured in position by means of a post 25 which extends outwardly from the cover 6 and projects through a hole 26 in said supplemental cover. Said post 25 is provided with a hole 27 to receive the wire 28 of a conventional seal 29.

It will be noted that, in order to avoid the possibility of causing a short circuit between said receptacles and the cover 6, the receptacles 20 are spaced from the cover 6 for a considerable distance and the prongs 32 are sufficiently short so that they will not reach the said receptacles, as they are inserted through the holes 21—21, until after the insulating sleeves 33 have entered said holes.

Assuming that a meter is mounted and sealed upon the flange 17 and the covers 23—23 are secured in position by the seals 29, and it is desired to remove the meter from the box without interrupting the supply of current to the building, the person authorized to do so first breaks the seals 29—29 and removes the covers 23—23. He then uses a pair of jumpers of conventional form, such as indicated at 30, each of which usually comprises an electric cord 31 having upon its ends a pair of connector prongs 32—32 and insulating sleeves 33—33 by means of which the prongs can be grasped by the user, and inserts said prongs 32—32 of one jumper through the two openings 21—21 at one side of the box and into the respective receptacles 20—20 aligned with said openings and also inserts the other jumper across the receptacles at the other side of the box so that each of said jumpers will be connected across the terminals in the box from one terminal 8 to its opposite terminal 10 and thus jump the electric current across said terminals instead of through the meter, whereby the meter may then be removed from the box without interrupting the supply of electric current.

When the meter is replaced and sealed in mounted position by an authorized person, the supplemental covers 23—23 are also replaced over the respective sets of holes 21—21 and sealed with the seals 29—29 to thereby prevent access to the receptacles 20—20 by unauthorized persons.

In the modified form illustrated in Fig. 7, the meter binding ring 34 may be provided with laterally extending tabs 35—35 which will overlie the covers 23—23 and prevent the removal of said covers while the binding ring 34 is in normal position and securing the meter to the flange 17 of the meter box. Said ring may be retained against rotation on the flange by means of a tongue 36, which projects from the flange 17 through a slot in the ring, and is secured to the flange 17 by a conventional binding screw 37 which is sealed by the seal 38. Therefore, in this modified form both the covers 23—23 and the ring 34 are sealed by a single conventional seal, such as commonly used on such binding rings, and the need for the seals 29—29 is therefore alleviated.

I claim:

1. An electric meter box having therein a set of terminals for electrical conductors leading into said box, a separate set of terminals for electrical conductors leading out of said box, a main cover for said box, means for mounting a meter upon said main cover and across said sets of terminals including an annular flange on said cover, a receptacle for a jumper connected to each of said terminals and spaced therefrom to be accessible from positions beyond a meter mounted on said box, a hole in said main cover in alignment with said receptacle, an auxiliary cover for closing said hole, a binding ring adapted to encircle said flange and cooperating means on the meter for securing said meter in mounted position, means extending from said binding ring and overlying said auxiliary cover for retaining it in closing position over the hole in the cover of the box, means preventing rotation of the ring relatively to said flange, and means for sealing said ring in meter securing and auxiliary cover retaining position.

2. An electric meter box having therein a set of terminals for electrical conductors leading into said box, a separate set of terminals for electrical conductors leading out of said box, a main cover for said box, means for mounting a meter on said main cover and across said set of terminals, a receptacle for a jumper connected to each of said terminals and spaced therefrom and accessible independently of a meter mounted on said box, said main cover having a hole in alignment with said receptacle, an auxiliary cover for closing said hole, a binding ring for securing said meter in mounted position to said box, extensions on said ring overlying said auxiliary cover to secure it in position over said hole, and means for sealing said ring in meter securing and auxiliary cover retaining position.

References Cited in the file of this patent

UNITED STATES PATENTS

| | | |
|---|---|---|
| 1,090,489 | Murray | Mar. 17, 1914 |
| 1,872,723 | Frank | Aug. 23, 1932 |
| 2,145,557 | Rypinski | Jan. 31, 1939 |
| 2,231,737 | Rutter | Feb. 11, 1941 |
| 2,370,043 | Johansson | Feb. 20, 1945 |
| 2,531,514 | Jensen | Nov. 28, 1950 |
| 2,782,387 | Coleman | Feb. 19, 1957 |
| 2,825,879 | Moore | Mar. 4, 1958 |

FOREIGN PATENTS

| | | |
|---|---|---|
| 132,216 | Great Britain | Sept. 11, 1919 |

OTHER REFERENCES

Shunt Devices Elec. World, page 56, January 6, 1958.